United States Patent [19]

Mains

[11] 3,719,872

[45] March 6, 1973

[54] ACCELERATION CONTROLLER FOR A DUAL STATOR INDUCTION MOTOR

[75] Inventor: Donald M. Mains, Greendale, Wis.

[73] Assignee: Bucyrus-Erie Company, South Milwaukee, Wis.

[22] Filed: Oct. 1, 1971

[21] Appl. No.: 185,501

[52] U.S. Cl. ............... 318/214, 318/243, 318/429
[51] Int. Cl. .............................................. H02p 1/26
[58] Field of Search ............... 318/214, 243, 429

[56] References Cited

UNITED STATES PATENTS

| | | | |
|---|---|---|---|
| 3,383,576 | 5/1968 | Kordik | 318/429 |
| 3,581,169 | 5/1971 | Calud et al. | 318/214 |

Primary Examiner—Gene Z. Rubinson
Attorney—Barry E. Sammons et al.

[57] ABSTRACT

The rotatable stator segment of a dual stator motor is revolved by an actuator motor in steps between a zero torque orientation and a maximum torque orientation. During start-up the actuator motor is controlled by an acceleration relay to increase the induction motor output torque each time it is activated by a pair of timing relays. During shut-down the actuator motor is controlled by a deceleration relay to decrease the induction motor output torque each time it is actuated by the timing relays. The minimum and maximum torque limits are sensed by switches which are connected to stop rotation of the rotatable stator segment when closed.

7 Claims, 5 Drawing Figures 3,719,872

ACCELERATION CONTROLLER FOR A DUAL STATOR INDUCTION MOTOR

BACKGROUND OF THE INVENTION

The field of the invention is controls for a-c motors and more specifically, controls for dual stator induction motors.

In the design of automated apparatus and systems, it is desirable to employ a-c motors. Particularly where large motors are needed, the cost of a-c to d-c converters becomes prohibitive and the use of a-c induction motors mandatory. Unfortunately, due to the inherent characteristics of large a-c induction motors, special and costly provisions must often be made to prevent damage to the motor or driven apparatus during start-up. More particularly, induction motors require very high armature current and generate very high accelerating torque at low motor speeds during start-up. If the motor load inertias are large, the power source and power lines feeding the motor must be very large to accomodate the high and often prolonged initial currents required during start-up. On the other hand, if the motor load inertias are small, the driven mechanical system or apparatus must be designed to withstand the large accelerating torque generated by the induction motor during start-up.

To avoid these problems, the present invention makes use of a dual stator drive induction motor. The dual stator motor is basically an a-c induction motor with its stator divided into two segments, either one or both of which may be rotatably adjusted relative to the other. This feature allows the phase relationship of the currents in the two stator segments, and consequently, the current which they induce in the rotor, to be adjusted with respect to one another for a continuous precise control of the torque of the motor. Dual stator drive motors, generally are well known to the art as evidenced by recent U.S. Pats. issued to Roe, Nos. 3,280,400; 3,280,928; and 3,290,574, as well as a U.S. Pat. to Barber, No. 3,581,170.

The dual stator arrangement provides an inexpensive and uncomplicated means for altering the torque speed characteristics of an a-c motor. This is accomplished by mechanically rotating one of the stator segments with respect to the other segment to provide the desired characteristics. Unfortunately, even though the dual stator motor has been available for many years, the failure to provide adequate means for controlling the relative positions of the stator segments has severely limited the application of the dual stator motor.

SUMMARY OF THE INVENTION

The present invention provides a circuit for controlling the acceleration of a dual stator drive induction motor. More specifically, the controller includes an actuator motor mechanically coupled to a rotatable stator segment on the dual stator induction motor; and actuator switch means connected to energize the actuator motor in response to timing means for periodically rotating the rotatable stator segment between its zero torque position and its maximum torque position. The timing means operates when manually started, to periodically energize the actuator motor for a preset time interval and then shut-off for a preset time interval. As a result, the actuator motor is repeatedly rotated to progressively move the rotatable stator segment from a zero-torque starting orientation to a maximum torque operating orientation. By adjusting the duration and spacing of the timed signals, the magnitude of the torque generated by the dual stator motor and the armature current required by it can be kept within acceptable limits during start-up.

A general object of the invention is to provide a reliable control for a dual stator drive induction motor, which control operates to limit the surge current and high torque associated with a-c motors during start-up. Before energizing the dual stator motor, its rotatable stator segment is placed in the zero-torque orientation. When started, therefore, high torque and the associated surge current are eliminated. The rotatable stator is then revolved, or rotated towards its maximum torque operating orientation in timed steps. The acceleration may be controlled by timing relays which are readily adjustable to match the characteristics of the motor with the specific load conditions.

Another object of the invention is to provide a control for a dual stator motor which will bring it to a smooth, controlled stop. By reversing the connection of the actuator switch means, the timing means operate the actuator motor to step the rotatable stator segment back to the zero-torque orientation. In the zero-torque orientation minimum armature current is flowing, and as a result, minimal sparking occurs when the dual stator induction motor is shut down.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not necessarily represent the full scope of the invention, and reference is made to the claims herein for interpreting the breadth of the invention.

DESCRIPTION OF THE PREFERRED EMBODIMENT

Figure 2:
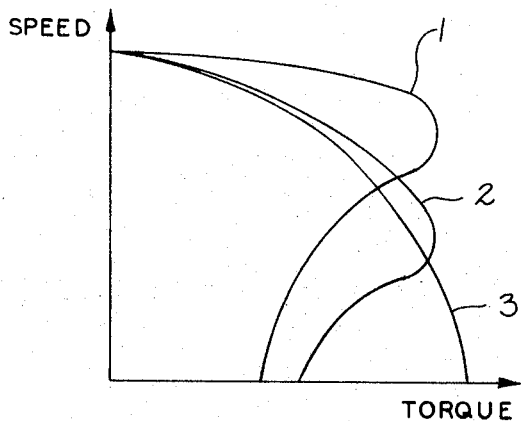
FIGS. 2 and 3 are graphs illustrating the output characteristics of a-c induction motors.

Referring to FIG. 2, curves 1, 2 and 3 show the torque-speed characteristics of an a-c induction motor. Curve 1 is characteristic of an a-c motor with little or no external rotor resistance while curves 2 and 3 indicate the result occurring when external rotor resistance is added. A dual stator induction motor displays the same characteristics, and in the preferred embodiment, the external load resistors are chosen to provide the characteristics displayed by curve 3.

Figure 3:
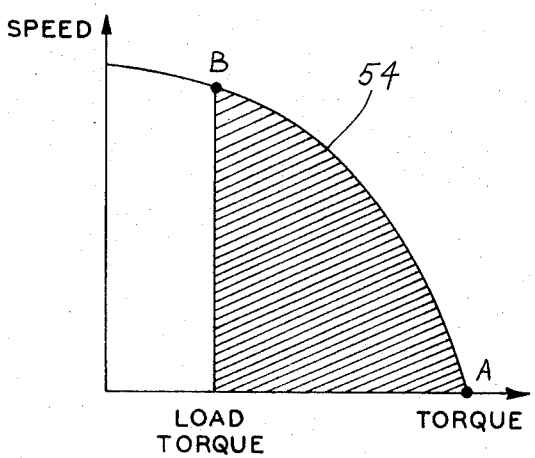

As shown by curve 54 in FIG. 3, if either an induction motor, or a dual stator induction motor with its stator segments locked, is attached to a fixed load, a large accelerating torque (approximately three times that of the load torque) is generated when the motor is first turned on. As motor speed builds, the operating point follows the characteristic curve 54 from the starting point A to a final steady-state operating point B. With very large load inertias, the motor will operate for significant periods of time at low speeds near starting point A. As a result, high rotor torque requiring high armature current is developed for significant periods of time which may overheat the motor or overload the power lines and power supply. Additionally, regardless of load inertia, the large accelerating forces produced by the high starting torque may cause excessive wear or damage to the driven mechanical load.

Figure 1:
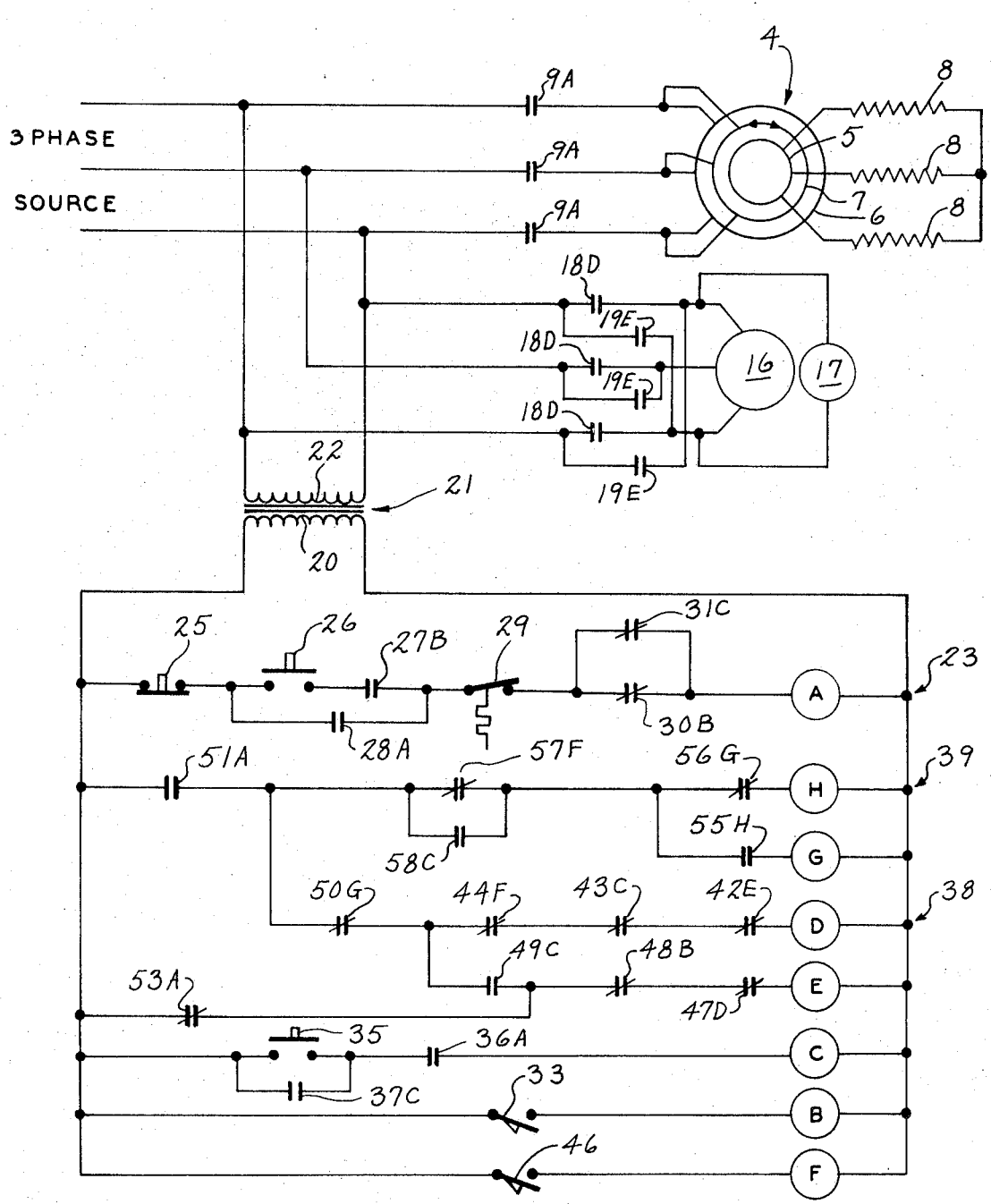
FIG. 1 is an electrical schematic diagram of the invented acceleration controller.

Referring to FIG. 1, a dual stator motor 4 is shown schematically connected to a three-phase power source. The motor 4 consists of a wound rotor 5, a fixed stator segment 6, and a rotatable stator segment 7. The rotor 5 is connected through slip rings and brushes (not shown in the drawings) to a set of three external resistors 8. The values of the resistors 8 are chosen such that a torque-speed curve similar to curve 3 in FIG. 2 is generated by the dual stator motor 4 when its stator segments 6 and 7 are in alignment. Each stator segment 6 and 7 is connected to the three-phase power source through a set of three motor line contacts 9. When a-c power is received, each stator segment 6 and 7 induces a voltage into the rotor winding 5. When the rotatable stator segment 7 is positioned such that its winding is electrically in phase with the winding on fixed stator segment 6, the induced rotor voltage is at a maximum, and the torque output of the dual stator motor 4 is at a maximum for any given operating speed. When the rotatable stator segment 7 is shifted such that the magnetic field generated by it is 180 electrical degrees out of phase with the field generated by the fixed stator winding 6, no voltage is induced in the rotor 5 and the motor 4 develops no output torque. Orientations intermediate these two limiting positions provide varying torque-speed characteristics.

Figure 4:
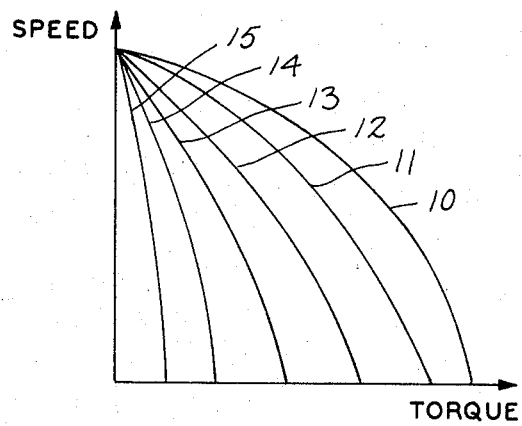
FIGS. 4 and 5 are graphs illustrating the output characteristics of a dual stator induction motor.

This feature of the dual stator induction motor is illustrated in FIG. 4 by the curves 10–15. The curve 10 indicates the torque-speed characteristic of the motor 4 when its stator segments 6 and 7 are aligned for maximum torque output, and the curves 11–15 indicate the torque-speed characteristic of the motor 4 when its stator segments 6 and 7 are progressively shifted towards the zero torque orientation. It should be apparent from the curves 10–15 in FIG. 4 that the initial high torque and associated surge current which occur during start-up of the dual stator motor 4 can be avoided by starting it with the rotatable stator segment 7 in the zero torque position. A controlled acceleration can then be obtained by progressively rotating the stator segment 7 towards the maximum torque orientation.

An acceleration controller for accomplishing this is shown in FIG. 1. It includes an actuator motor 16 which is mechanically coupled to the rotatable stator segment 7 through a speed reducer and gearing (not shown in the drawings). The actuator motor 16 is a small squirrel cage induction motor equipped with a face mounted energize-to-release brake 17. The brake serves to hold the actuator motor 16 and the rotatable stator segment 7 in a fixed position when the actuator motor 16 is deenergized. The actuator motor 16 is connected to the three-phase power source through a set of three actuator line contacts 18, and a set of three reverse actuator line contacts 19. When the forward actuator line contacts 18 are closed, the actuator motor 16 is energized, and the rotatable stator segment 7 is rotated away from the zero torque position and towards the maximum torque position. When the reverse actuator line contacts 19 are closed, the actuator motor 16 is energized to rotate the stator segment 7 in the opposite direction, towards the zero torque position.

The circuitry for controlling the actuator line contacts 18 and 19 is connected to the secondary winding 20 of a step-down transformer 21. A primary winding 22 on the step-down transformer 21 is connected to a pair of the terminals on the three-phase power source. The step-down transformer 21 provides electrical power to a series of control branches, each of which branches contains a relay coil that is to be energized when its branch becomes conductive. Each relay coil magnetically actuates one or more sets of electrical contacts. To clarify the schematic diagram in FIG. 1, these relay contacts are identified not only with a distinctive name and number, but also with a letter which corresponds to their associated coil.

A first, or main power branch 23 contains a motor coil A which magnetically actuates the motor line contacts 9 when energized. The main power branch 23 also includes a normally closed emergency stop pushbutton 25 connected in series with a normally open start pushbutton 26 and normally open zero torque contacts 27. Self-holding contacts 28 are connected to shunt the start pushbutton 26 and the zero torque contacts 27, and are magnetically actuated by the motor coil A. Connected in series between the zero torque contacts 27 and the motor coil A are the motor protective thermostats 29 and normally closed zero torque contacts 30. The protective thermostats 29 are located on the dual stator induction motor 4 and are operable to open the main power branch 23 when the induction motor 4 overheats. Finally, the zero torque contacts 30 are shunted by normally closed shut-down contacts 31.

The zero torque contacts 27 and 30 are magnetically actuated by a zero torque coil B connected in a separate branch. The zero torque coil B is connected in series with a zero torque limit switch 33 across the transformer secondary 20. The zero torque limit switch 33 is attached to the dual stator induction motor 4 and is closed thereby when the stator segments 6 and 7 are in the zero torque orientation.

The shut-down contacts 31 are magnetically actuated by a shut-down coil C. The shut-down coil C is connected in series across the transformer secondary winding 20 with a normally open shut-down pushbutton 35 and normally open motor coil contacts 36. Normally open self-holding contacts 37 are connected across the shut-down pushbutton 35 and are magnetically actuated by the shut-down coil C.

The circuitry described thus far operates generally to start and stop the induction motor 4. The motor 4 is started by energizing motor coil A to thus close the motor line contacts 9. This occurs when the start pushbutton 26 is depressed, and two conditions are present: the protective thermostats 29 must not be open due to overheating; and the rotatable stator segment 7 must be in the zero torque position. This latter condition closes the zero torque limit switch 33, thus energizing zero torque coil B, closing zero torque contacts 27 and opening the zero torque contacts 30. When thus energized, motor coil A closes self-holding contacts 28 to retain conduction through the main branch 23 when the start pushbutton 26 is released.

Shut-down is initiated by depressing the shut-down pushbutton 35. Shut-down coil C is energized and self-holding contacts 37 are thereby closed to maintain conduction through it when the shut-down pushbutton 35 is released. The energized shut-down coil C operates not only to actuate the shut-down contacts 31 in the main branch 23, but also to initiate operation of an actuator switch branch 38 and a timing branch 39. As will be described below in further detail, during shut-down the actuator switch branch 38 and timing branch 39 operate to revolve the rotatable stator segment 7 back to the zero torque orientation. As a result, zero torque limit switch 33 is closed, and zero torque coil B energized. Zero torque contacts 30 in the main branch 23 are thereby opened. Consequently, contacts 30 and 31 are open and the main branch 23 open circuits to turn off the dual stator motor 4.

It should be apparent from the description thus far that the rotatable stator 7 is in the zero torque position when the induction motor 4 is both started and shut down. As a result, the motor line contacts 9 need not make or break large currents. This feature may, of course, be bypassed in cases of emergency by pressing the emergency stop pushbutton 25. In such case the main branch 23 is opened regardless of stator segment orientation and the induction motor is immediately turned off.

The position of the rotatable stator segment 7 is controlled by the actuator switch branch 38. The branch 38 includes a first sub-branch containing an acceleration coil D magnetically coupled to actuate the forward actuator line contacts 18, and a second sub-branch containing a deceleration coil E magnetically coupled to actuate the reverse actuator line contacts 19. Acceleration coil D is connected in series with normally closed deceleration contacts 42 which are magnetically actuated by deceleration coil E. It is also in series with normally closed shut-down contacts 43 which are magnetically actuated by shut-down coil C, and in series with normally closed maximum torque contacts 44. Maximum torque contacts 44 are magnetically actuated by a maximum torque coil F connected in series across the transformer secondary winding 20 with a maximum torque limit switch 46. Limit switch 46 is attached to the dual stator motor 4 and is closed thereby when the rotatable stator segment 7 is oriented in the maximum torque position.

Deceleration coil E is connected in series with normally closed acceleration contacts 47 which are magnetically actuated by the acceleration coil D. It is also connected in series with normally closed zero torque contacts 48 which are magnetically actuated by zero torque coil B, and in series with normally open shut-down contacts 49 which are magnetically actuated by shut-down coil C.

The two sub-branches containing acceleration coil D and deceleration coil E are connected in series across the transformer secondary winding 20 with normally closed timing contacts 50 and normally open motor coil contacts 51. Contacts 51 are magnetically actuated by motor coil A when the dual stator motor 4 is running. Timing contacts 50 are magnetically actuated by a rest timing relay coil G in the timing branch 39 to be described below. The actuator switch branch 38 also includes normally closed motor coil contacts 53 connected in shunt relation with contacts 49, 50 and 51.

As discussed above, before the motor coil A can be energized to start the induction motor 4, the rotatable stator segment 7 must be oriented in the zero torque position. A first function of the actuator switch branch 38 is, therefore, to insure this condition. When the rotatable stator segment 7 is not in the zero torque position, zero torque contacts 48 in the actuator switch branch 38 are closed to complete the circuit including deceleration coil E and motor coil contacts 53. As a result, reverse actuator line contacts 19 are closed, and actuator motor 16 drives the rotatable stator segment 7 to the zero torque position. At this point, zero torque contacts 48 open and the starting operation described above can commence.

The timing branch 39 includes a first sub-branch containing the rest time delay coil G connected in series with normally open timing relay contacts 55. It also includes a second sub-branch containing a timing relay coil H connected in series with normally closed rest timing relay contacts 56. Timing relay contacts 55 are magnetically actuated by timing relay coil H, and rest timing relay contacts 56 are magnetically actuated by rest timing relay coil G. The parallel sub-branches are connected in series across transformer secondary winding 20 with the motor coil contacts 51 and normally closed maximum torque contacts 57. Normally open shut-down contacts 58 are connected in shunt relation across the contacts 57 and are magnetically actuated by shut-down coil C. Maximum torque contacts 57 are magnetically actuated by maximum torque coil F. The two timing relays including coils G and H along with their associated contacts 50, 55 and 56, are each commercially available timing relays. These timing relays operate to actuate their contacts when their coil is energized. Unlike standard relays, however, when the timing relay coil H is energized, its contacts 55 are actuated a fixed time interval later, and when the rest delay relay coil G is deenergized, its contacts 50 and 56 remain actuated for a preset time interval. These time intervals are readily adjustable to provide the delay required.

During start-up, the actuator switch branch 38 and timing branch 39 operate in combination with the actuator motor 16 to revolve the rotatable stator segment 7 from the zero torque position to the maximum torque position. When motor coil contacts 51 are closed during start-up, timing relay coil H is energized through closed contacts 56 and 57. Also, acceleration coil D is energized through timing contacts 50 and contacts 42, 43 and 44. As a result, forward actuator line contacts 18 are closed and the actuator motor 16 is energized to revolve the rotatable stator segment 7. This continues until the timing relay coil H "times out," at which point the timing relay contacts 55 close and energize rest time delay coil G. Timing contacts 50 and rest timing relay contacts 56 immediately open to deenergize timing relay coil H and acceleration coil D. The actuator motor 16 is thus deenergized and the rotatable stator segment 7 is locked in position. Also, timing relay contacts 55 open to deenergize rest time delay coil G and start its timing cycle. When coil G times out, timing contacts 50 and rest timing relay contacts 56 are again closed to repeat the operating cycle. The actuator motor 16 is again energized by accelerator coil D for a time period determined by the delay time of timing relay coil H, and then deenergized for a time period determined by the delay time of rest timing relay coil G.

Figure 5:
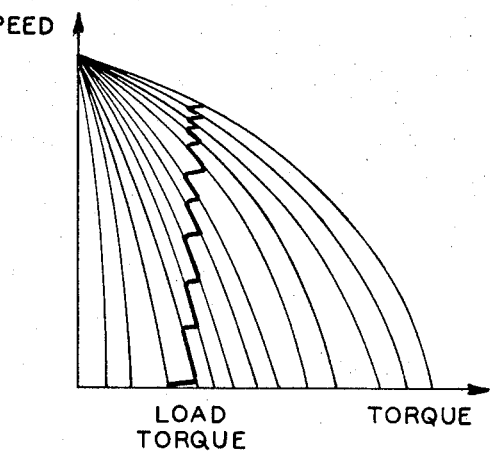

As illustrated graphically in FIG. 5, the operating cycle described above repeats until the rotatable stator segment 7 is positioned in the maximum torque, or operating orientation. The rotatable stator segment 7 may thus be revolved in steps at a rate and duration required by the load conditions and motor characteristics. The rate of these steps and the duration of each is readily controlled by adjusting the time delays associated with the relay coils G and H.

When the maximum torque orientation is reached, maximum torque limit switch 46 is closed, and maximum torque coil F energized to open maximum torque contacts 44 in the actuator switch branch 38 and to open contacts 57 in the timing branch 39. The relay coils D, G and H are thus deenergized and the rotatable stator segment 7 is locked in position by the brake 17.

The circuit operates essentially the same during shutdown. However, during shut-down, shut-down contacts 43 are open and shut-down contacts 49 are closed. As a result, deceleration coil E is alternately energized and deenergized by timing contacts 50 controlled by the timing branch 39. The actuator motor 16 therefore, revolves the rotatable stator segment 7 towards the zero torque position. When this point is reached, the main branch 23 opens to turn off the induction motor 4 and motor coil contacts 51 open to deenergize the timing branch 39. Zero torque contacts 48 in the actuator switch branch 38 also open at this time to deenergize deceleration coil E.

The preferred embodiment of the invention shown and described herein discloses a "hard wired" relay control circuit for a dual stator induction motor. It should be apparent to those skilled in the art, however, that other means of implementing the invention are possible. For example, controllers may be programmed to implement many of the functions described herein, or logic gates may be substituted to perform the logical operations described herein.

I claim:

1. A controller for a dual stator induction motor, the combination comprising:
an actuator motor mechanically coupled to rotate the stator segments with respect to one another between a zero torque orientation and a maximum torque orientation when energized; and
actuator switch means connected to energize the actuator motor, said actuator switch means includes timing means operable to repeatedly operate said actuator switch means for predetermined time intervals and to thereby rotate the stator segments with respect to one another in steps between the zero torque and maximum torque orientations.

2. The controller as recited in claim 1, wherein said actuator switch means includes
acceleration switch means connected to said actuator motor to repeatedly energize the same and thereby rotate the stator segments towards their maximum torque orientation, and
deceleration switch means connected to said actuator motor to repeatedly energize the same and thereby rotate the stator segments towards their zero torque orientation.

3. The controller as recited in claim 2 in which said actuator switch means includes timing means connected to both said acceleration switch means and said deceleration switch means, said timing means being operable to repeatedly actuate said acceleration switch means for predetermined time intervals when said dual stator induction motor is started up, and being operable to repeatedly actuate said deceleration switch means for predetermined time intervals when said dual stator induction motor is shut down.

4. The controller as recited in claim 3 which includes:
a maximum torque limit switch mechanically connected to said dual stator motor to sense the relative position of the stator segments and electrically connected to said actuator switch means to deenergize said actuator motor when said stator segments are in their maximum torque orientation; and
a zero torque limit switch mechanically connected to said dual stator motor to sense the relative position of the stator segments and electrically connected to said actuator switch means to deenergize said actuator motor when said stator segments are in their zero torque orientation.

5. A controller for a dual stator induction motor, the combination comprising:
an actuator motor mechanically coupled to rotate the stator segments with respect to one another between a zero torque orientation and a maximum torque orientation;
an acceleration relay connected to energize said actuator motor and to thereby rotate said stator segments toward their maximum torque orientation when said acceleration relay is energized;
a deceleration relay connected to energize said actuator motor and to thereby rotate said stator segments toward their zero torque orientation when said deceleration relay is energized;
a shut-down relay having contacts in circuit with said acceleration relay and contacts in circuit with said deceleration relay; and
a timing branch adapted to repeatedly energize said acceleration relay for predetermined time intervals when said shut-down relay is in one state, and to repeatedly energize said deceleration relay for predetermined time intervals when said shut-down relay is in its other state.

6. The controller as recited in claim 5 which includes:
a maximum torque limit switch means mechanically connected to said dual stator motor to sense the relative position of the stator segments and electrically connected in circuit with said acceleration relay to prevent energization of the same when said stator segments are in their maximum torque orientation; and
a minimum torque limit switch means mechanically connected to said dual stator motor to sense the relative position of the stator segments and electrically connected in circuit with said deceleration relay to prevent energization of the same when said stator segments are in their zero torque orientation.

7. The controller as recited in claim 5 wherein said actuator motor is an a-c induction motor.

* * * * *